(12) United States Patent
Muchherla et al.

(10) Patent No.: US 12,524,174 B2
(45) Date of Patent: *Jan. 13, 2026

(54) DYNAMIC SUPERBLOCK CONSTRUCTION

(71) Applicant: Micron Technology, Inc., Boise, ID (US)

(72) Inventors: Kishore K. Muchherla, Fremont, CA (US); Jianmin Huang, San Carlos, CA (US); Xiangang Luo, Fremont, CA (US)

(73) Assignee: Micron Technology, Inc., Boise, ID (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/669,038

(22) Filed: May 20, 2024

(65) Prior Publication Data

US 2024/0311029 A1    Sep. 19, 2024

Related U.S. Application Data

(63) Continuation of application No. 17/464,316, filed on Sep. 1, 2021, now Pat. No. 11,989,433.

(51) Int. Cl.
*G06F 3/06* (2006.01)
(52) U.S. Cl.
CPC ............ *G06F 3/064* (2013.01); *G06F 3/0604* (2013.01); *G06F 3/0679* (2013.01)
(58) Field of Classification Search
CPC ...... G06F 3/064; G06F 3/0604; G06F 3/0679; G06F 3/0608; G06F 3/0631
See application file for complete search history.

(56) References Cited

U.S. PATENT DOCUMENTS

| | | | |
|---|---|---|---|
| 8,737,148 B2 * | 5/2014 | Byom | G11C 29/883 365/230.03 |
| 2012/0047409 A1 | 2/2012 | Post et al. | |
| 2014/0231954 A1 | 8/2014 | Lue | |
| 2016/0004464 A1 | 1/2016 | Shen | |
| 2016/0179386 A1 | 6/2016 | Zhang | |
| 2017/0286286 A1 | 10/2017 | Szubbocsev | |
| 2018/0190329 A1 | 7/2018 | Kathawala | |
| 2018/0373438 A1 | 12/2018 | Western | |
| 2020/0042201 A1 | 2/2020 | Huang | |
| 2021/0182466 A1 | 6/2021 | Hahn | |
| 2021/0240614 A1 | 8/2021 | Western | |
| 2021/0365200 A1 * | 11/2021 | Alwala | G06F 3/0604 |
| 2022/0004336 A1 * | 1/2022 | Naghate | G11C 16/32 |
| 2022/0270703 A1 * | 8/2022 | Chandramani | G11C 11/5671 |

FOREIGN PATENT DOCUMENTS

WO    2017074570 A1    5/2017

OTHER PUBLICATIONS

Choudhuri, et al., "Performance Improvement of Block Based NAND Flash Translation Layer", retrieved from https://www.ics.uci.edu/~givargis/pubs/C32.pdf., Sep. 30-Oct. 3, 2007, 6 pages.

* cited by examiner

*Primary Examiner* — Francisco A Grullon
(74) *Attorney, Agent, or Firm* — Brooks, Cameron & Huebsch, PLLC

(57) ABSTRACT

A method includes forming at least a portion of a first superblock using a first subset of blocks from at least one memory die of a memory sub-system and forming at least a portion of a second superblock using a second subset of blocks from the at least one memory die of the memory sub-system.

20 Claims, 5 Drawing Sheets

DYNAMIC SUPERBLOCK CONSTRUCTION

PRIORITY INFORMATION

This application is a Continuation of U.S. application Ser. No. 17/464,316, filed on Sep. 1, 2021, the contents of which are incorporated herein by reference.

TECHNICAL FIELD

Embodiments of the disclosure relate generally to memory sub-systems, and more specifically, relate to dynamic superblock construction.

BACKGROUND

A memory sub-system can include one or more memory devices that store data. The memory devices can be, for example, non-volatile memory devices and volatile memory devices. In general, a host system can utilize a memory sub-system to store data at the memory devices and to retrieve data from the memory devices.

BRIEF DESCRIPTION OF THE DRAWINGS

The present disclosure will be understood more fully from the detailed description given below and from the accompanying drawings of various embodiments of the disclosure.

DETAILED DESCRIPTION

Figure 1:
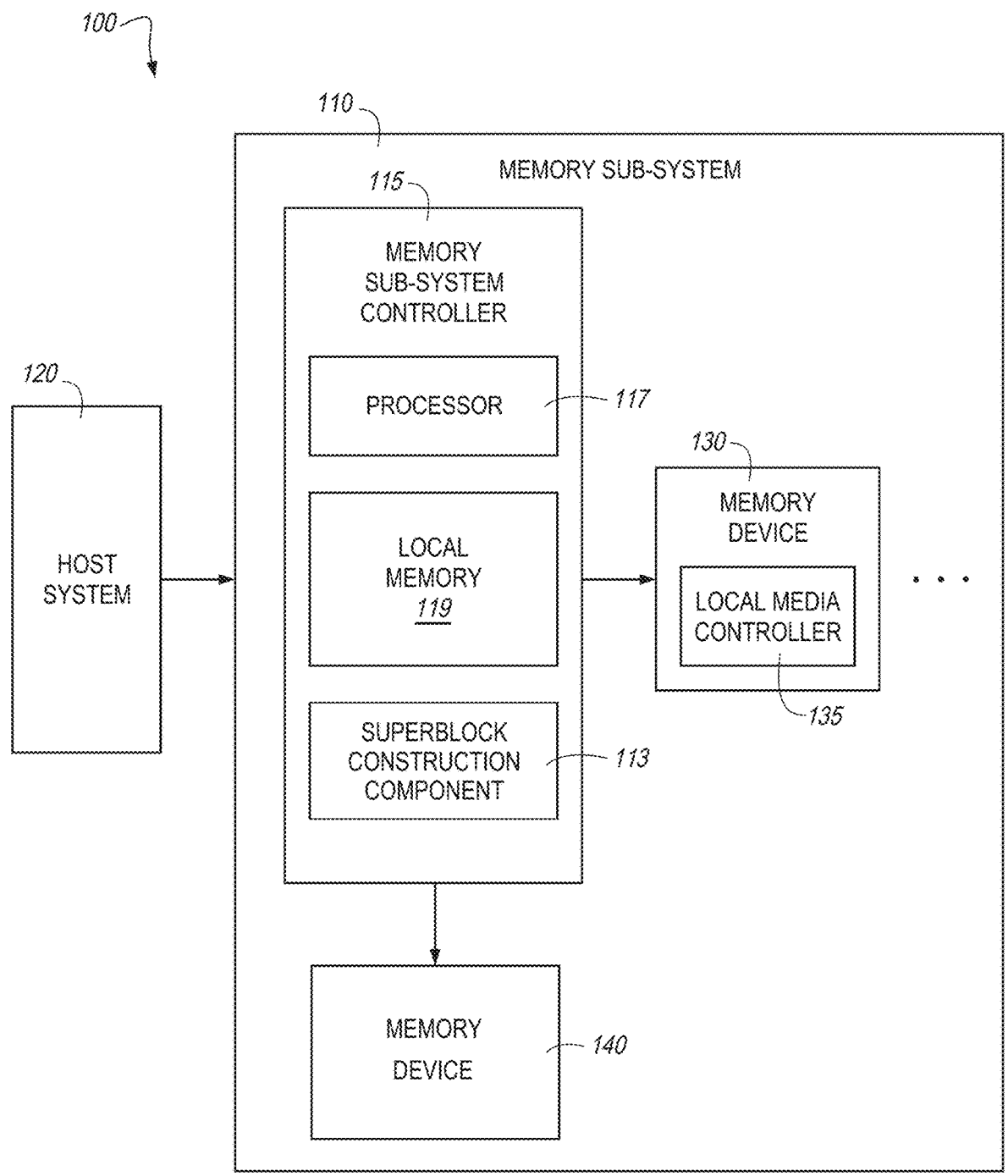
FIG. 1 illustrates an example computing system that includes a memory sub-system in accordance with some embodiments of the present disclosure.

Aspects of the present disclosure are directed to dynamic superblock construction, in particular to memory sub-systems that include a superblock construction component to dynamically construct superblocks in a memory sub-system. A memory sub-system can be a storage system, storage device, a memory module, or a combination of such. An example of a memory sub-system is a storage system such as a solid-state drive (SSD). Examples of storage devices and memory modules are described below in conjunction with FIG. 1, et alibi. In general, a host system can utilize a memory sub-system that includes one or more components, such as memory devices that store data. The host system can provide data to be stored at the memory sub-system and can request data to be retrieved from the memory sub-system.

A memory device can be a non-volatile memory device. One example of non-volatile memory devices is a negative-and (NAND) memory device (also known as flash technology). Other examples of non-volatile memory devices are described below in conjunction with FIG. 1. A non-volatile memory device is a package of one or more dice. Each die can consist of one or more planes. Planes can be groups into logic units (LUN). For some types of non-volatile memory devices (e.g., NAND devices), each plane consists of a set of physical blocks. Each block consists of a set of pages. Each page consists of a set of memory cells ("cells"). A cell is an electronic circuit that stores information. A block hereinafter refers to a unit of the memory device used to store data and can include a group of memory cells, a word line group, a word line, or individual memory cells. For some memory devices, blocks (also hereinafter referred to as "memory blocks") are the smallest area than can be erased. Pages cannot be erased individually, and only whole blocks can be erased.

Each of the memory devices can include one or more arrays of memory cells. Depending on the cell type, a cell can store one or more bits of binary information, and has various logic states that correlate to the number of bits being stored. The logic states can be represented by binary values, such as "0" and "1", or combinations of such values. There are various types of cells, such as single level cells (SLCs), multi-level cells (MLCs), triple level cells (TLCs), and quad-level cells (QLCs). For example, a SLC can store one bit of information and has two logic states.

Some NAND memory devices employ a floating-gate architecture in which memory accesses are controlled based on a relative voltage change between the bit line and the word lines. Other examples of NAND memory devices can employ a replacement-gate architecture that can include the use of word line layouts that can allow for charges corresponding to data values to be trapped within memory cells based on properties of the materials used to construct the word lines.

Some non-volatile (e.g., NAND flash) memory devices construct superblocks (e.g., block stripes) that include a memory block from every plane of every memory die associated with the non-volatile memory device. As used herein, the term "superblock" generally refers to a set of blocks that span multiple die that are written in an interleaved fashion. In some cases, a superblock may span all the die within an SSD. A superblock may contain multiple blocks from a single die. A superblock may be a unit of management within the SSD. Further, as used herein the term "spans," especially in the context of "spanning" multiple planes or memory dice generally refers to a condition in which multiple planes and/or memory dice are invoked. For example, if a memory device has two memory dice, it can be said that the memory dice are "spanned" when at least one memory block or memory plane for each of the memory dice is invoked or otherwise utilized.

By constructing superblocks that include one memory block from each plane of every memory die of the non-volatile memory device, plane parallelism can be maximized, thereby improving performance of the non-volatile memory device. In addition, in approaches that construct superblocks that include one memory block from each plane of every memory die of the non-volatile memory device, data management structures (e.g., mapping tables, etc.) employed by the non-volatile memory device can be simplified, thereby reducing complexity of tracking and/or managing each memory block of a superblock.

Because the number of superblocks that can be constructed in a non-volatile memory device is limited by the number of planes and/or the number of memory dice in the non-volatile memory device, in the above-described paradigms, superblocks that are essentially as large as possible are constructed since a memory block from each plane of every memory die is selected to construct the superblocks. Accordingly, in some approaches, the fewer the quantity of blocks per plane, the fewer superblocks that can be constructed because some approaches require that one block from each plane and/or from each die is contributed to the superblock. This can, in such approaches, further lead to a minimum number of superblocks being constructed (again, since a memory block from each plane of every memory die is selected to construct the superblocks).

However, not all memory systems benefit from the perceived advantages of maximized parallelism among superblocks utilized in the approaches described above. For example, in some memory devices, or during execution of certain kinds of workloads using the memory device, it may not be necessary to maximize parallelism amongst the superblocks to achieve desirable performance of the non-volatile memory device.

In addition, approaches that construct superblocks using a memory block from each plane of every memory die can reserve greater than a required amount of overprovisioned memory blocks, which can degrade memory system performance. For example, if ten superblocks are reserved as overprovisioned space (e.g., are dedicated swap blocks and/or open blocks) and there are two hundred total superblocks, 5% of the available memory resources of the memory system can be reserved as overprovisioned space. In some circumstances, this be an excessive amount of overprovisioned space.

Aspects of the present disclosure address the above and other deficiencies by providing for dynamic construction of superblocks for a memory device (e.g., a non-volatile memory device, such as a NAND flash memory device). For example, as described in more detail below, aspects of the present disclosure allow for dynamic construction of superblocks that do not include a memory block from each plane of every memory die. As used herein, the term "dynamic," in the context of construction of superblocks, generally refers to the ability to construct or modify superblocks during runtime of the non-volatile memory device (as opposed to at manufacture of the non-volatile memory device).

By dynamically constructing superblocks that do not include a memory block from each plane of every memory die of the memory device, a greater number of smaller superblocks can be constructed as compared to the approaches described above in which a memory block from each plane of every memory die is included in each superblock. Although embodiments herein can lead to a reduction in memory system parallelism, the amount of overprovisioned space associated with the memory system can be reduced. For instance, in a non-limiting example, if the total quantity of superblocks is increased to two hundred-fifty superblocks, from the illustrative example above in which the memory system includes two hundred superblocks, then only 4% of the available memory resources of the memory system can be reserved as overprovisioned space.

FIG. 1 illustrates an example computing system 100 that includes a memory sub-system 110 in accordance with some embodiments of the present disclosure. The memory sub-system 110 can include media, such as one or more volatile memory devices (e.g., memory device 140), one or more non-volatile memory devices (e.g., memory device 130), or a combination of such.

A memory sub-system 110 can be a storage device, a memory module, or a hybrid of a storage device and memory module. Examples of a storage device include a solid-state drive (SSD), a flash drive, a universal serial bus (USB) flash drive, an embedded Multi-Media Controller (eMMC) drive, a Universal Flash Storage (UFS) drive, a secure digital (SD) card, and a hard disk drive (HDD). Examples of memory modules include a dual in-line memory module (DIMM), a small outline DIMM (SO-DIMM), and various types of non-volatile dual in-line memory modules (NVDIMMs).

The computing system 100 can be a computing device such as a desktop computer, laptop computer, server, network server, mobile device, a vehicle (e.g., airplane, drone, train, automobile, or other conveyance), Internet of Things (IoT) enabled device, embedded computer (e.g., one included in a vehicle, industrial equipment, or a networked commercial device), or such computing device that includes memory and a processing device.

The computing system 100 can include a host system 120 that is coupled to one or more memory sub-systems 110. In some embodiments, the host system 120 is coupled to different types of memory sub-system 110. FIG. 1 illustrates one example of a host system 120 coupled to one memory sub-system 110. As used herein, "coupled to" or "coupled with" generally refers to a connection between components, which can be an indirect communicative connection or direct communicative connection (e.g., without intervening components), whether wired or wireless, including connections such as electrical, optical, magnetic, and the like.

The host system 120 can include a processor chipset and a software stack executed by the processor chipset. The processor chipset can include one or more cores, one or more caches, a memory controller (e.g., an SSD controller), and a storage protocol controller (e.g., PCIe controller, SATA controller). The host system 120 uses the memory sub-system 110, for example, to write data to the memory sub-system 110 and read data from the memory sub-system 110.

The host system 120 can be coupled to the memory sub-system 110 via a physical host interface. Examples of a physical host interface include, but are not limited to, a serial advanced technology attachment (SATA) interface, a peripheral component interconnect express (PCIe) interface, universal serial bus (USB) interface, Fibre Channel, Serial Attached SCSI (SAS), Small Computer System Interface (SCSI), a double data rate (DDR) memory bus, a dual in-line memory module (DIMM) interface (e.g., DIMM socket interface that supports Double Data Rate (DDR)), Open NAND Flash Interface (ONFI), Double Data Rate (DDR), Low Power Double Data Rate (LPDDR), or any other interface. The physical host interface can be used to transmit data between the host system 120 and the memory sub-system 110. The host system 120 can further utilize an NVM Express (NVMe) interface to access components (e.g., memory devices 130) when the memory sub-system 110 is coupled with the host system 120 by the PCIe interface. The physical host interface can provide an interface for passing control, address, data, and other signals between the memory sub-system 110 and the host system 120. FIG. 1 illustrates a memory sub-system 110 as an example. In general, the host system 120 can access multiple memory sub-systems via a same communication connection, multiple separate communication connections, and/or a combination of communication connections.

The memory devices 130, 140 can include any combination of the different types of non-volatile memory devices and/or volatile memory devices. The volatile memory devices (e.g., memory device 140) can be, but are not limited to, random access memory (RAM), such as dynamic random-access memory (DRAM) and synchronous dynamic random access memory (SDRAM).

Some examples of non-volatile memory devices (e.g., memory device 130) include negative-and (NAND) type flash memory and write-in-place memory, such as three-dimensional cross-point ("3D cross-point") memory device, which is a cross-point array of non-volatile memory cells. A cross-point array of non-volatile memory can perform bit storage based on a change of bulk resistance, in conjunction with a stackable cross-gridded data access array. Additionally, in contrast to many flash-based memories, cross-point non-volatile memory can perform a write in-place operation, where a non-volatile memory cell can be programmed without the non-volatile memory cell being previously erased. NAND type flash memory includes, for example, two-dimensional NAND (2D NAND) and three-dimensional NAND (3D NAND).

Each of the memory devices 130, 140 can include one or more arrays of memory cells. One type of memory cell, for example, single level cells (SLC) can store one bit per cell. Other types of memory cells, such as multi-level cells (MLCs), triple level cells (TLCs), quad-level cells (QLCs), and penta-level cells (PLC) can store multiple bits per cell. In some embodiments, each of the memory devices 130 can include one or more arrays of memory cells such as SLCs, MLCs, TLCs, QLCs, or any combination of such. In some embodiments, a particular memory device can include an SLC portion, and an MLC portion, a TLC portion, a QLC portion, or a PLC portion of memory cells. The memory cells of the memory devices 130 can be grouped as pages that can refer to a logical unit of the memory device used to store data. With some types of memory (e.g., NAND), pages can be grouped to form blocks.

Although non-volatile memory components such as three-dimensional cross-point arrays of non-volatile memory cells and NAND type memory (e.g., 2D NAND, 3D NAND) are described, the memory device 130 can be based on any other type of non-volatile memory or storage device, such as such as, read-only memory (ROM), phase change memory (PCM), self-selecting memory, other chalcogenide based memories, ferroelectric transistor random-access memory (FeTRAM), ferroelectric random access memory (FeRAM), magneto random access memory (MRAM), Spin Transfer Torque (STT)-MRAM, conductive bridging RAM (CBRAM), resistive random access memory (RRAM), oxide based RRAM (OxRAM), negative-or (NOR) flash memory, and electrically erasable programmable read-only memory (EEPROM).

The memory sub-system controller 115 (or controller 115 for simplicity) can communicate with the memory devices 130 to perform operations such as reading data, writing data, or erasing data at the memory devices 130 and other such operations. The memory sub-system controller 115 can include hardware such as one or more integrated circuits and/or discrete components, a buffer memory, or a combination thereof. The hardware can include digital circuitry with dedicated (i.e., hard-coded) logic to perform the operations described herein. The memory sub-system controller 115 can be a microcontroller, special purpose logic circuitry (e.g., a field programmable gate array (FPGA), an application specific integrated circuit (ASIC), etc.), or other suitable processor.

The memory sub-system controller 115 can include a processor 117 (e.g., a processing device) configured to execute instructions stored in a local memory 119. In the illustrated example, the local memory 119 of the memory sub-system controller 115 includes an embedded memory configured to store instructions for performing various processes, operations, logic flows, and routines that control operation of the memory sub-system 110, including handling communications between the memory sub-system 110 and the host system 120.

In some embodiments, the local memory 119 can include memory registers storing memory pointers, fetched data, etc. The local memory 119 can also include read-only memory (ROM) for storing micro-code. While the example memory sub-system 110 in FIG. 1 has been illustrated as including the memory sub-system controller 115, in another embodiment of the present disclosure, a memory sub-system 110 does not include a memory sub-system controller 115, and can instead rely upon external control (e.g., provided by an external host, or by a processor or controller separate from the memory sub-system).

In general, the memory sub-system controller 115 can receive commands or operations from the host system 120 and can convert the commands or operations into instructions or appropriate commands to achieve the desired access to the memory device 130 and/or the memory device 140. The memory sub-system controller 115 can be responsible for other operations such as wear leveling operations, garbage collection operations, error detection and error-correcting code (ECC) operations, encryption operations, caching operations, and address translations between a logical address (e.g., logical block address (LBA), namespace) and a physical address (e.g., physical block address, physical media locations, etc.) that are associated with the memory devices 130. The memory sub-system controller 115 can further include host interface circuitry to communicate with the host system 120 via the physical host interface. The host interface circuitry can convert the commands received from the host system into command instructions to access the memory device 130 and/or the memory device 140 as well as convert responses associated with the memory device 130 and/or the memory device 140 into information for the host system 120.

The memory sub-system 110 can also include additional circuitry or components that are not illustrated. In some embodiments, the memory sub-system 110 can include a cache or buffer (e.g., DRAM) and address circuitry (e.g., a row decoder and a column decoder) that can receive an address from the memory sub-system controller 115 and decode the address to access the memory device 130 and/or the memory device 140.

In some embodiments, the memory device 130 includes local media controllers 135 that operate in conjunction with memory sub-system controller 115 to execute operations on one or more memory cells of the memory devices 130. An external controller (e.g., memory sub-system controller 115) can externally manage the memory device 130 (e.g., perform media management operations on the memory device 130). In some embodiments, a memory device 130 is a managed memory device, which is a raw memory device combined with a local controller (e.g., local controller 135) for media management within the same memory device package. An example of a managed memory device is a managed NAND (MNAND) device.

The memory sub-system 110 can include a superblock construction component 113. Although not shown in FIG. 1 so as to not obfuscate the drawings, the superblock construction component 113 can include various circuitry to facilitate monitoring temperature characteristics for a memory sub-system and/or components of the memory sub-system, determining when and/or whether to perform operations to dynamically construct one or more superblocks for the memory sub-system and/or components of the memory sub-system. In some embodiments, the superblock construction component 113 can include special purpose circuitry in the form of an ASIC, FPGA, state machine, and/or other logic circuitry that can allow the superblock construction component 113 to orchestrate and/or perform operations to dynamically construct superblocks for the memory device 130 and/or the memory device 140 based on determined operating conditions of the memory sub-system 110.

In some embodiments, the memory sub-system controller 115 includes at least a portion of the superblock construction component 113. For example, the memory sub-system controller 115 can include a processor 117 (processing device) configured to execute instructions stored in local memory 119 for performing the operations described herein. In some embodiments, the superblock construction component 113 is part of the host system 110, an application, or an operating system.

In some embodiments, the memory sub-system 110, and hence the superblock construction component 113, the processor 119, and the memory devices 130/140, can be resident on a mobile computing device such as a smartphone, laptop, phablet, Internet-of-Things device, autonomous vehicle, or the like. As used herein, the term "mobile computing device" generally refers to a handheld computing device that has a slate or phablet form factor. In general, a slate form factor can include a display screen that is between approximately 3 inches and 5.2 inches (measured diagonally), while a phablet form factor can include a display screen that is between approximately 5.2 inches and 7 inches (measured diagonally). Examples of "mobile computing devices" are not so limited, however, and in some embodiments, a "mobile computing device" can refer to an IoT device, among other types of edge computing devices.

Figure 2:
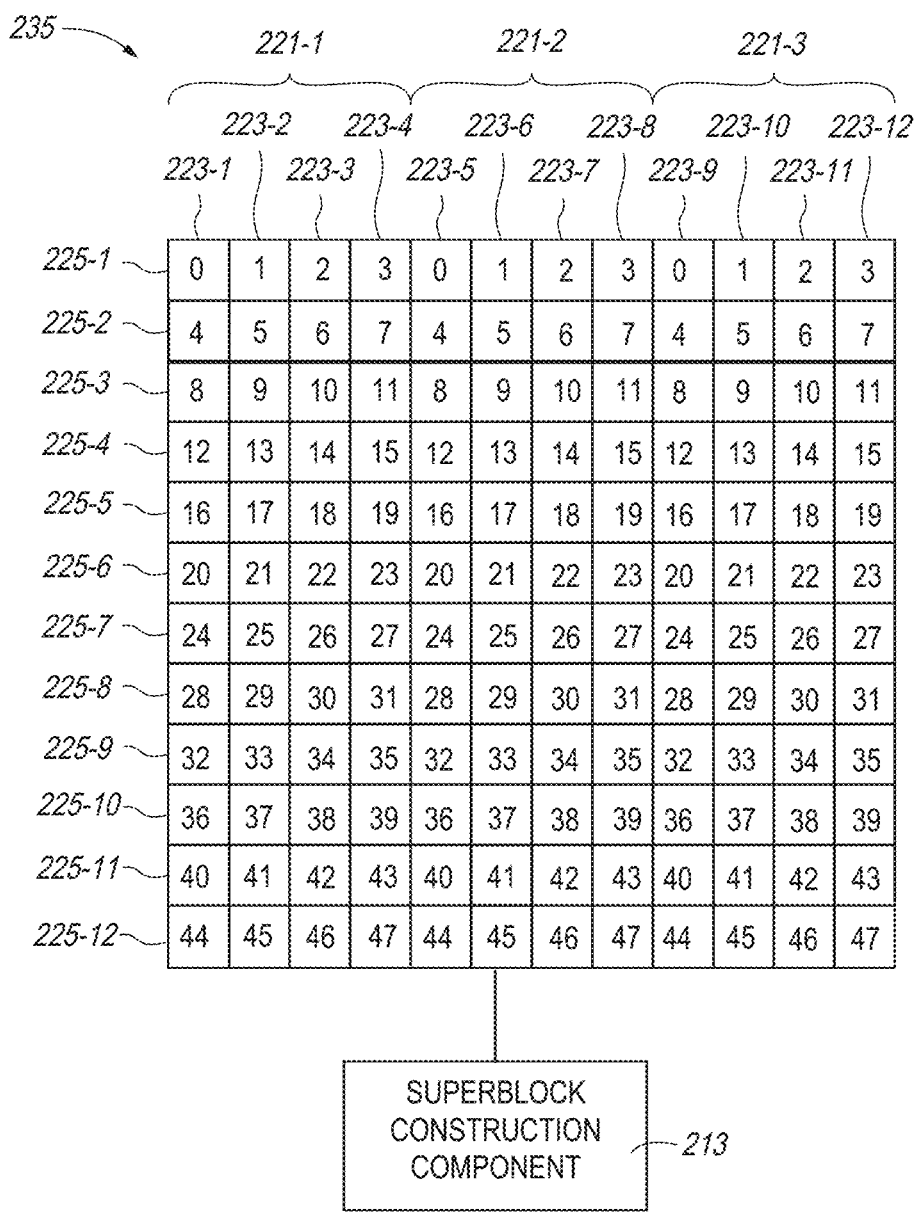
FIG. 2 illustrates an example memory device in accordance with some embodiments of the present disclosure.

In a non-limiting example, an apparatus (e.g., the computing system 100) can include a memory device (e.g., the memory device 130 and/or the memory device 140) that includes multiple memory dice (e.g., the memory dice 221-1 to 221-3 illustrated in FIG. 2, herein). In some embodiments, each of the memory dice can include multiple planes (e.g., the planes 223-1 to 223-12 illustrated in FIG. 2, herein) that can each include multiple memory blocks as described in more detail in connection with FIG. 2 and FIG. 3, herein. The apparatus can further include a superblock construction component 113. The media management throttling component 113 can be resident on the memory sub-system 110. As used herein, the term "resident on" refers to something that is physically located on a particular component. For example, the superblock construction component 113 being "resident on" the memory sub-system 110 refers to a condition in which the hardware circuitry that comprises the superblock construction component 113 is physically located on the memory sub-system 110. The term "resident on" can be used interchangeably with other terms such as "deployed on" or "located on," herein.

Figure 3:
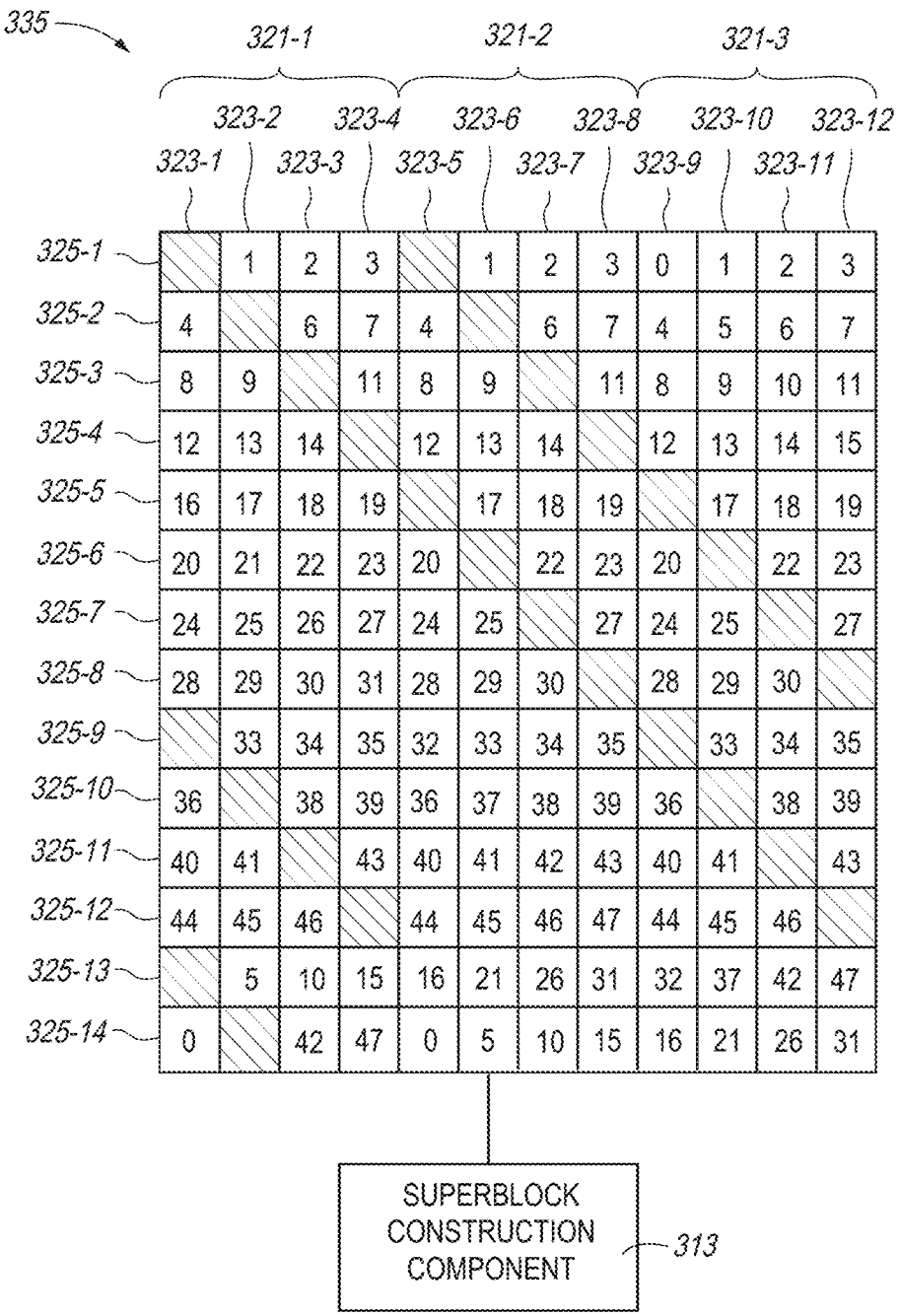
FIG. 3 illustrates another example memory device in accordance with some embodiments of the present disclosure.

The superblock construction component 113 can cause a first superblock (e.g., one of the superblocks 225-1 to 225-12 and/or the superblocks 325-1 to 325-14 illustrated in FIG. 2 and FIG. 3, respectively) to be formed using blocks from a plurality of planes of each of the memory dice. The superblock construction component 113 can further cause a second superblock to be formed using at least one block from each of the plurality of planes of each of the memory dice. In some embodiments, the first superblock or the second superblock, or both, can include a set of memory blocks that span each memory die among the plurality of memory dice. For example, the first superblock and/or the second superblock can be formed such that at least one memory block from each of the memory dice is included within the first superblock and/or the second superblock, as described in more detail below.

In some embodiments, data can be written to the first superblock and/or the second superblock in an interleaved fashion. As used herein, writing the data to the first superblock and/or the second superblock in an "interleaved fashion" generally refers to a scenario in which data is written to the superblocks such that multiple memory device and/or multiple planes are written to concurrently.

Continuing with this example, the superblock construction component 113 can cause the first superblock or the second superblock, or both, to be formed such that an amount of overprovisioned memory blocks associated with the memory device is altered. For example, as described in more detail in connection with FIG. 3, below, if the superblocks are formed such that each superblock contains all but one memory block across all the planes and memory dice, an amount of overprovisioned memory blocks can be reduced, thereby improving the performance and/or overall capacity of the memory sub-system 110. In a non-limiting example, if ten superblocks are reserved as overprovisioned space (e.g., are dedicated swap blocks and/or open blocks) and there are two hundred total superblocks, 5% of the available memory resources of the memory sub-system 110 can be reserved as overprovisioned space. However, as described herein, by increasing the total number of superblocks, the amount of memory reserved as overprovisioned space can be reduced. For example, if the total quantity of superblocks is increased to two hundred-fifty superblocks, then only 4% of the available memory resources of the memory sub-system 110 can be reserved as overprovisioned space. This savings in overprovisioned space can be beneficial to operation of the memory sub-system 110, especially when the memory sub-system 110 is deployed in a mobile computing device.

In some embodiments, at least one of the first superblock or the second superblock contains at least one fewer memory block than a superblock that includes one memory block from each plane of the memory device. For example, as described in more detail in connection with FIG. 3, herein, if there are twelve memory blocks arranged across three memory dice of the memory device and each of the memory dice contains four planes, at least one of the first superblock or the second superblock can include eleven memory blocks (as opposed to the total twelve memory blocks available). However, it will be appreciated that embodiments are no limited to this particular illustrative example.

Continuing with this example, in some embodiments, the superblock construction component 113 can cause the second superblock to be formed such that at least one block of at least the portion of the second superblock is not in a same plane among the plurality of planes of memory blocks as a block that is included in at least the portion of the first superblock. For example, as described in more detail in connection with FIG. 3, herein, if the first superblock is the superblock 325-13 and the second superblock is the superblock 325-14 illustrated in FIG. 3, the hashed (e.g., skipped or empty) block in the superblock 325-13 that is above block "0" of the superblock 325-14 is not in the plane 323-1. Similarly, if the first superblock is the superblock 325-13 and the second superblock is the superblock 325-14 illustrated in FIG. 3, the hashed (e.g., skipped or empty) block in the superblock 325-14 that is below block "5" of the superblock 325-13 is not in the plane 323-2.

FIG. 2 illustrates an example memory device 235 in accordance with some embodiments of the present disclosure. The memory device 235 can be analogous to the memory device 130 and/or the memory device 140 illustrated in FIG. 1. The memory device 235 can be coupled to a superblock construction component 213, which can be analogous to the superblock construction component 113 illustrated in FIG. 1. As illustrated in FIG. 2, the memory device 235 can include multiple superblocks 225-1, 225-2, 225-3, 225-4, 225-5, 225-6, 225-7, 225-8, 225-9, 225-10, 225-11, and 225-12 (collectively referred to herein as superblocks 225). As shown in FIG. 2, the superblocks 225 each span multiple memory dice 221-1, 221-2, and 221-3.

Each of the memory dice 221-1, 221-2, 221-3 can include multiple planes 223-1, 223-2, 223-3, 223-4, 223-5, 223-6, 223-7, 223-8, 223-9, 223-10, 223-11, and 223-12 (collectively referred to herein as the planes 223) of memory cells. Although not explicitly shown, the planes 223 can be coupled to word lines (e.g., access lines) and/or digit lines. In some embodiments, the memory device 235 can include at least one set of interleaved NAND memory cells that are coupled to a stackable cross-gridded array of memory cells (e.g., a 3-D NAND device) and/or can be a portion of a replacement-gate NAND device.

The memory device 235 further includes multiple memory cells, which are indicated by the Arabic numerals 0 to 47. In the example shown in FIG. 2, each of the memory dice 221-1, 221-2, and 221-3 include forty-eight (48) memory cells, however, embodiments are not limited to any particular number of memory cells, memory dice, or planes.

FIG. 3 illustrates another example memory device 335 in accordance with some embodiments of the present disclosure. The memory device 335 can be analogous to the memory device 235 illustrated in FIG. 2, herein. The memory device 335 can be coupled to a superblock construction component 313, which can be analogous to the superblock construction component 113 illustrated in FIG. 1 and/or the superblock construction component 213 illustrated in FIG. 2. As illustrated in FIG. 3, the memory device 335 can include multiple superblocks 325-1, 325-2, 325-3, 325-4, 325-5, 325-6, 325-7, 325-8, 325-9, 325-10, 325-11, 325-12, 325-14, and 325-14 (collectively referred to herein as superblocks 325). Further, as shown in FIG. 3, the superblocks 325 each span multiple memory dice 321-1, 321-2, and 321-3.

Each of the memory dice 321-1, 321-2, 321-3 can include multiple planes 323-1, 323-2, 323-3, 323-4, 323-5, 323-6, 323-7, 323-8, 323-9, 323-10, 323-11, and 323-12 (collectively referred to herein as the planes 323) of memory cells. Although not explicitly shown, the planes 323 can be coupled to word lines (e.g., access lines) and/or digit lines. In some embodiments, the memory device 335 can include at least one set of interleaved NAND memory cells that are coupled to a stackable cross-gridded array of memory cells (e.g., a 3-D NAND device) and/or can be a portion of a replacement-gate NAND device.

In contrast to the memory device 235 illustrated in FIG. 2, the memory device 335 of FIG. 3 includes multiple superblocks 325 that are constructed such that each superblock 325 does not include a memory block from each plane 323 of each of the memory dice 321. The memory blocks that are "skipped" during construction of the superblocks 325 illustrated in FIG. 3 are indicated by the presence of a hashing pattern. In addition, the numbering convention of FIG. 2 with respect to the memory blocks is retained in FIG. 3 to illustrate a non-limiting example of which memory blocks can be included in the additional superblocks 325-13 and 325-14. That is, in contrast to the embodiment illustrated in FIG. 2 where the memory block "0" of plane 223-1 is located in superblock 225-1, in FIG. 3, the memory block "0" of plane 323-1 is located in superblock 325-14. Similarly, in contrast to the embodiment illustrated in FIG. 2 where the memory block "5" of plane 223-2 is located in superblock 225-2, in FIG. 3, the memory block "5" of plane 323-1 is located in superblock 325-13. As will be appreciated, physical addresses associated with the memory blocks assigned to each of the superblocks 325 can be tracked and/or stored in a data structure as coordinated by the superblock construction component 313 to allow access to data written to the superblocks 325.

Although two additional constructed superblocks (the superblock 325-13 and the superblock 325-14) are shown in FIG. 3 in comparison with the embodiment illustrated in FIG. 2, embodiments are not so limited and the construction of differing numbers of additional superblocks (e.g., 4 additional superblocks, 6 superblocks, etc.) are contemplated within the scope of the disclosure. In addition, although the superblocks 325 are illustrated in FIG. 3 as including ten or eleven memory blocks per superblock 325, embodiments are not so limited, and superblocks can be dynamically constructed by the superblock construction component 313 that included differing numbers of memory blocks (e.g., six memory blocks, eight memory blocks, etc.). For example, superblocks 325 can be constructed by the superblock construction component 313 that include half of the memory blocks from each of the memory dice 321 by forming a first superblock having, for example, memory blocks "0" and "2" from each of the memory dice 321 and a second superblock can be formed that includes memory blocks "1" and "3" from each of the memory dice 321. This pattern could be repeated for each memory block such that twenty-four superblocks 325 each having six memory blocks are formed. Because it is not mandatory that each of the superblocks 325 include the same number of blocks, embodiments are not limited to the example shown in FIG. 3. In general, the matrix of 12×12 (e.g., 144 blocks) shown in FIG. 2 has been rearranged in FIG. 3 to a 12×10 matrix and a 2×12 matrix. To further illustrate the non-limiting nature of these examples, if instead FIG. 2 included 40 superblocks, one example of how the matrix of blocks could be organized is as a 48×10 matrix in FIG. 3.

In a non-limiting example, a system (e.g., the computing system 100 illustrated in FIG. 1, herein) can include a memory device 335 that includes multiple blocks of NAND memory cells (e.g., the memory blocks described in connection with FIG. 2 and FIG. 3, herein) arranged into a plurality of planes 323. Subsets of the planes 323 can be associated with respective memory dice 321 of the memory device 335. A processing device (e.g., the superblock construction component 313) can be coupled to the memory device 335. In some embodiments, the processing device can perform operations including forming at least a portion of a first superblock (e.g., the superblock 325-13 using a first subset of planes from at least one memory die 321 of a memory device 335 and forming at least a portion of a second superblock (e.g., the superblock 325-14) using a second subset of planes from the at least one memory die of the memory device 335.

Continuing with this example, in some embodiments, the processing device can perform operations that include forming the first superblock or the second superblock, or both, such that at least one of the first superblock or the second superblocks contains fewer memory blocks than a superblock that is formed using one memory block from each plane 323 of the plurality of planes corresponding to each of the respective memory dice 321, as described above. In some embodiments, the processing device can perform operations including forming the first superblock such that at least one block from each memory die 321 of the memory device 335 is contained within the first superblock and/or perform operations including forming the second superblock such that at least one block from each memory die 321 of the memory device 335 is contained within the second superblock. Accordingly, in some embodiments, the first superblock and/or the second superblock can include a set of memory blocks that span each memory die 321-1, 321-2, 321-3 among the memory dice 321.

In some embodiments, the processing device can perform operations including forming at least the portion of the second superblock such that at least one block of at least the portion of the second superblock is not in a same plane 323 of at least one of the memory dice 321-1, 321-2, 321-3 as a block that is included in at least the portion of the first superblock. Continuing with this example, in some embodiments, the processing device can perform operations including writing data to the first superblock or the second superblock, or both, in an interleaved fashion, as described above.

In some embodiments, the processing device can perform operations including forming the first superblock and/or forming the second superblock to alter an amount of overprovisioned memory blocks associated with the memory device 335. As described above, by reducing the amount of overprovisioned resources allocated to the memory device 335 as superblocks, storage capability of the memory device 335 (and, consequently a memory sub-system, mobile device, etc.) in which the memory device 335 is deployed can be improved.

Figure 4:
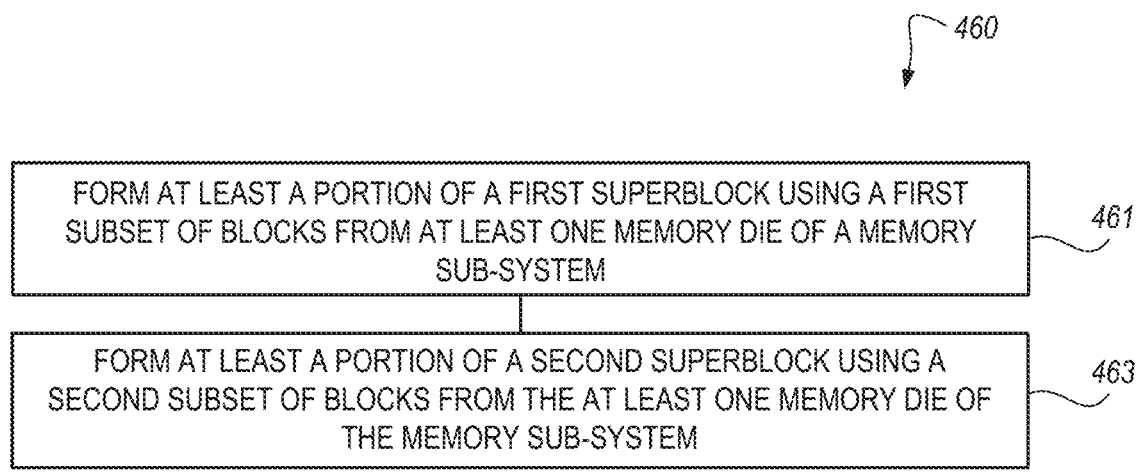
FIG. 4 is a flow diagram corresponding to a method for dynamic superblock construction in accordance with some embodiments of the present disclosure.

FIG. 4 is flow diagram corresponding to a method 460 for dynamic superblock construction in accordance with some embodiments of the present disclosure. The method 460 can be performed by processing logic that can include hardware (e.g., processing device, circuitry, dedicated logic, programmable logic, microcode, hardware of a device, integrated circuit, etc.), software (e.g., instructions run or executed on a processing device), or a combination thereof. In some embodiments, the method 460 is performed by the superblock construction component 113 of FIG. 1. Although shown in a particular sequence or order, unless otherwise specified, the order of the processes can be modified. Thus, the illustrated embodiments should be understood only as examples, and the illustrated processes can be performed in a different order, and some processes can be performed in parallel. Additionally, one or more processes can be omitted in various embodiments. Thus, not all processes are required in every embodiment. Other process flows are possible.

At operation 461, at least a portion of a first superblock using a first subset of blocks from at least one memory die of a memory sub-system can be formed. The memory die can be analogous to one of the memory dice 321-1, 321-2, or 321-3 illustrated in FIG. 3, herein, while the memory sub-system can be analogous to the memory sub-system 110 illustrated in FIG. 1, herein.

At operation 463, at least a portion of a second superblock using a second subset of blocks from the at least one memory die of the memory sub-system can be formed. The first superblock and/or the second superblock can be analogous to one of the superblocks 325 illustrated in FIG. 3, herein. In some embodiments, the first superblock can be formed such that at least one block from each memory die of the memory sub-system is contained within the first superblock and/or the second superblock can be formed such that at least one block from each memory die of the memory sub-system is contained within the second superblock.

As discussed above, the first superblock and/or the second superblock can be formed to reduce an amount of overprovisioned memory blocks associated with the memory sub-system. By way of a non-limiting example, if ten superblocks are reserved as overprovisioned space (e.g., are dedicated swap blocks and/or open blocks) and there are two hundred total superblocks, 5% of the available memory resources of the memory sub-system. can be reserved as overprovisioned space. However, as described herein, by increasing the total number of superblocks, the amount of memory reserved as overprovisioned space can be reduced. For example, if the total quantity of superblocks is increased to two hundred-fifty superblocks, then only 4% of the available memory resources of the memory sub-system. can be reserved as overprovisioned space. This savings in overprovisioned space can be beneficial to operation of the memory sub-system, especially when the memory sub-system is deployed in a mobile computing device.

As described above, at least one block of the first subset of blocks can be associated with a first plane of the at least one memory die and/or at least one block of the second subset of blocks can be associated with a second plane of the at least one memory die. In some embodiments, the first superblock and/or the second superblock can be formed such that at least one of the first superblock or the second superblocks contains fewer memory blocks than a superblock that is formed using one memory block from each plane of the at least memory die of the memory sub-system. Further, in some embodiments, at least the portion of the second superblock can be formed such that at least one block of at least the portion of the second superblock is not in a same plane of the at least memory die as a block that is included in at least the portion of the first superblock.

Figure 5:
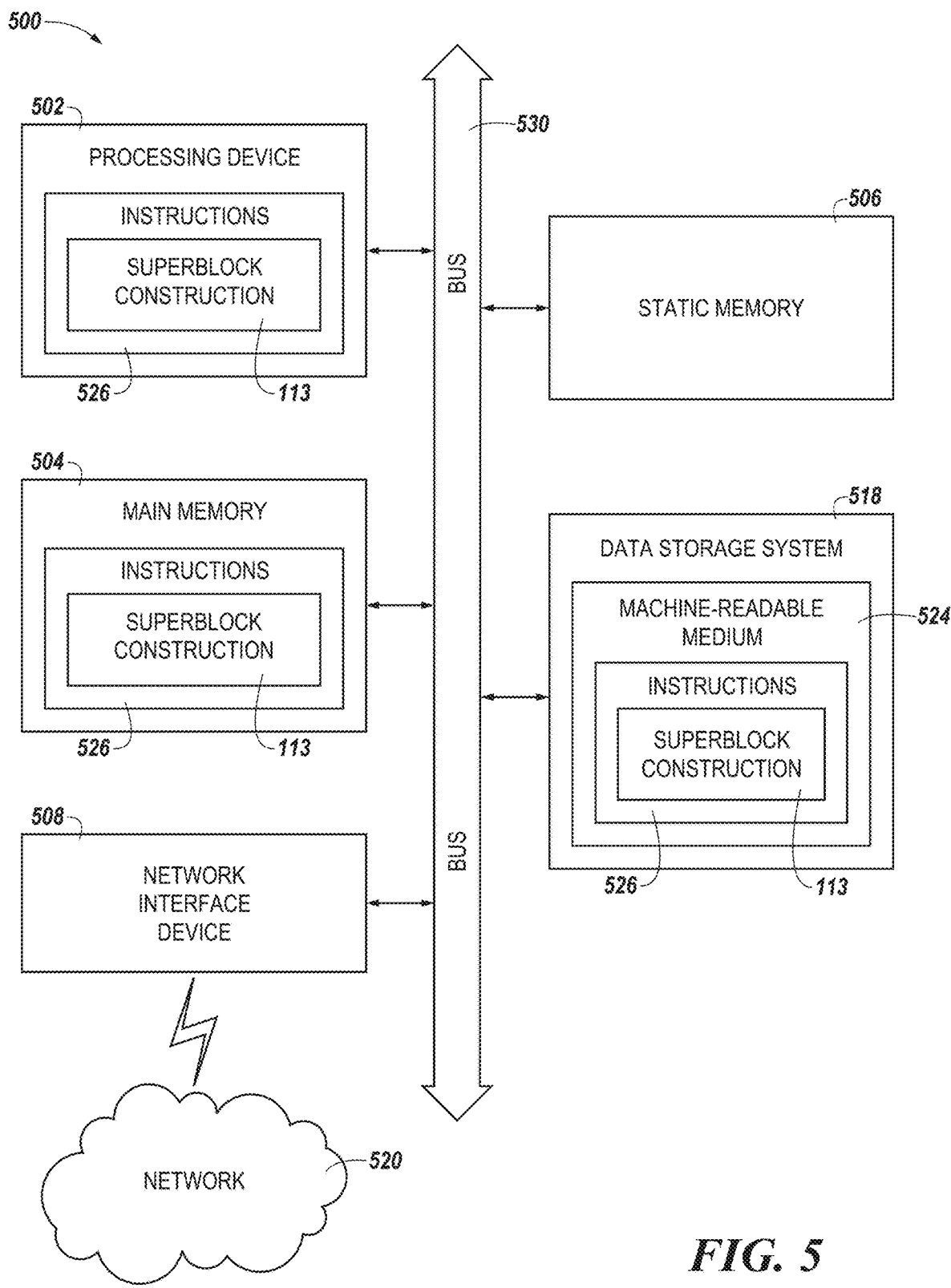
FIG. 5 is a block diagram of an example computer system in which embodiments of the present disclosure may operate.

FIG. 5 is a block diagram of an example computer system 500 in which embodiments of the present disclosure may operate. For example, FIG. 5 illustrates an example machine of a computer system 500 within which a set of instructions, for causing the machine to perform any one or more of the methodologies discussed herein, can be executed. In some embodiments, the computer system 500 can correspond to a host system (e.g., the host system 120 of FIG. 1) that includes, is coupled to, or utilizes a memory sub-system (e.g., the memory sub-system 110 of FIG. 1) or can be used to perform the operations of a controller (e.g., to execute an operating system to perform operations corresponding to the superblock construction component 113 of FIG. 1). In alternative embodiments, the machine can be connected (e.g., networked) to other machines in a LAN, an intranet, an extranet, and/or the Internet. The machine can operate in the capacity of a server or a client machine in client-server network environment, as a peer machine in a peer-to-peer (or distributed) network environment, or as a server or a client machine in a cloud computing infrastructure or environment.

The machine can be a personal computer (PC), a tablet PC, a set-top box (STB), a Personal Digital Assistant (PDA), a cellular telephone, a web appliance, a server, a network router, a switch or bridge, or any machine capable of executing a set of instructions (sequential or otherwise) that specify actions to be taken by that machine. Further, while a single machine is illustrated, the term "machine" shall also be taken to include any collection of machines that individually or jointly execute a set (or multiple sets) of instructions to perform any one or more of the methodologies discussed herein.

The example computer system 500 includes a processing device 502, a main memory 504 (e.g., read-only memory (ROM), flash memory, dynamic random access memory (DRAM) such as synchronous DRAM (SDRAM) or Rambus DRAM (RDRAM), etc.), a static memory 506 (e.g., flash memory, static random access memory (SRAM), etc.), and a data storage system 518, which communicate with each other via a bus 530.

The processing device 502 represents one or more general-purpose processing devices such as a microprocessor, a central processing unit, or the like. More particularly, the processing device can be a complex instruction set computing (CISC) microprocessor, reduced instruction set computing (RISC) microprocessor, very long instruction word (VLIW) microprocessor, or a processor implementing other instruction sets, or processors implementing a combination of instruction sets. The processing device 502 can also be one or more special-purpose processing devices such as an application specific integrated circuit (ASIC), a field programmable gate array (FPGA), a digital signal processor (DSP), network processor, or the like. The processing device 502 is configured to execute instructions 526 for performing the operations and steps discussed herein. The computer system 500 can further include a network interface device 508 to communicate over the network 520.

The data storage system 518 can include a machine-readable storage medium 524 (also known as a computer-readable medium) on which is stored one or more sets of instructions 526 or software embodying any one or more of the methodologies or functions described herein. The instructions 526 can also reside, completely or at least partially, within the main memory 504 and/or within the processing device 502 during execution thereof by the computer system 500, the main memory 504 and the processing device 502 also constituting machine-readable storage media. The machine-readable storage medium 524, data storage system 518, and/or main memory 504 can correspond to the memory sub-system 110 of FIG. 1.

In one embodiment, the instructions 526 include instructions to implement functionality corresponding to a superblock construction component (e.g., the superblock construction component 113 of FIG. 1). While the machine-readable storage medium 524 is shown in an example embodiment to be a single medium, the term "machine-readable storage medium" should be taken to include a single medium or multiple media that store the one or more sets of instructions. The term "machine-readable storage medium" shall also be taken to include any medium that is capable of storing or encoding a set of instructions for execution by the machine and that cause the machine to perform any one or more of the methodologies of the present disclosure. The term "machine-readable storage medium" shall accordingly be taken to include, but not be limited to, solid-state memories, optical media, and magnetic media.

Some portions of the preceding detailed descriptions have been presented in terms of algorithms and symbolic representations of operations on data bits within a computer memory. These algorithmic descriptions and representations are the ways used by those skilled in the data processing arts to most effectively convey the substance of their work to others skilled in the art. An algorithm is here, and generally, conceived to be a self-consistent sequence of operations leading to a desired result. The operations are those requiring physical manipulations of physical quantities. Usually, though not necessarily, these quantities take the form of electrical or magnetic signals capable of being stored, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. The present disclosure can refer to the action and processes of a computer system, or similar electronic computing device, that manipulates and transforms data represented as physical (electronic) quantities within the computer system's registers and memories into other data similarly represented as physical quantities within the computer system memories or registers or other such information storage systems.

The present disclosure also relates to an apparatus for performing the operations herein. This apparatus can be specially constructed for the intended purposes, or it can include a general purpose computer selectively activated or reconfigured by a computer program stored in the computer. Such a computer program can be stored in a computer readable storage medium, such as, but not limited to, any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions, each coupled to a computer system bus.

The algorithms and displays presented herein are not inherently related to any particular computer or other apparatus. Various general purpose systems can be used with programs in accordance with the teachings herein, or it can prove convenient to construct a more specialized apparatus to perform the method. The structure for a variety of these systems will appear as set forth in the description below. In addition, the present disclosure is not described with reference to any particular programming language. It will be appreciated that a variety of programming languages can be used to implement the teachings of the disclosure as described herein.

The present disclosure can be provided as a computer program product, or software, that can include a machine-readable medium having stored thereon instructions, which can be used to program a computer system (or other electronic devices) to perform a process according to the present disclosure. A machine-readable medium includes any mechanism for storing information in a form readable by a machine (e.g., a computer). In some embodiments, a machine-readable (e.g., computer-readable) medium includes a machine (e.g., a computer) readable storage medium such as a read only memory ("ROM"), random access memory ("RAM"), magnetic disk storage media, optical storage media, flash memory devices, etc.

In the foregoing specification, embodiments of the disclosure have been described with reference to specific example embodiments thereof. It will be evident that various modifications can be made thereto without departing from the broader spirit and scope of embodiments of the disclosure as set forth in the following claims. The specification and drawings are, accordingly, to be regarded in an illustrative sense rather than a restrictive sense.

What is claimed is:

1. An apparatus, comprising:
a memory device comprising multiple memory dice each comprising a plurality of planes of memory blocks; and
a controller coupled to the memory device and configured to adjust a particular amount of overprovisioning by adjusting a quantity of memory blocks allocated per superblock from a first quantity to a second quantity;

wherein the first quantity corresponds to a quantity in which each superblock comprises a memory block from each die of the multiple dice and from each plane of the plurality of planes; and wherein the second quantity corresponds to a quantity in which each superblock comprises at least one memory block from each die of the multiple dice but from fewer than all planes of at least one of the multiple dice.

2. The apparatus of claim 1, wherein the controller is configured to dynamically adjust the amount of overprovisioning by dynamically adjusting the quantity of memory blocks allocated per superblock.

3. The apparatus of claim 1, wherein the controller is configured to form a first superblock having the second quantity of memory blocks allocated thereto by omitting a memory block from a first particular plane of a first one of the multiple dice.

4. The apparatus of claim 3, wherein the controller is configured to form a second superblock having the second quantity of memory blocks allocated thereto by omitting a memory block from a second particular plane of the first one of the multiple dice.

5. The apparatus of claim 3, wherein the controller is configured to form a second superblock having the second quantity of memory blocks allocated thereto by omitting a memory block from a second particular plane of a second one of the multiple dice.

6. The apparatus of claim 1, wherein the controller is configured to form a first superblock having the second quantity of memory blocks allocated thereto by:
   omitting a first memory block from a first particular plane of a first one of the multiple dice; and
   omitting a second memory block from the first particular plane of a second one of the multiple dice.

7. The apparatus of claim 6, wherein the controller is configured to form a second superblock having the second quantity of memory blocks allocated thereto by:
   omitting a first memory block from a second particular plane of the first one of the multiple dice; and
   omitting a second memory block from the second particular plane of the second one of the multiple dice.

8. The apparatus of claim 1, wherein the controller is configured to form a first superblock having the second quantity of memory blocks allocated thereto by:
   omitting a first memory block from a first particular plane of a first one of the multiple dice; and
   omitting a second memory block from a second particular plane of a second one of the multiple dice.

9. The apparatus of claim 8, wherein the controller is configured to form a second superblock having the second quantity of memory blocks allocated thereto by:
   omitting a first memory block from the first particular plane of the first one of the multiple dice; and
   omitting a second memory block from the second particular plane of the second one of the multiple dice.

10. The apparatus of claim 1, wherein the memory device is a NAND Flash memory device.

11. A method, comprising:
   forming superblocks within a memory device comprising multiple memory dice, wherein each memory die comprises a plurality of planes of memory blocks; and
   adjusting, from a first quantity to a second quantity, a particular quantity of memory blocks allocated per superblock to adjust an amount of overprovisioning associated with the memory device;
   wherein the first quantity corresponds to a quantity in which each superblock comprises a memory block from each die of the multiple dice and from each plane of the plurality of planes; and
   wherein the second quantity corresponds to a quantity in which each superblock comprises at least one memory block from each die of the multiple dice but from fewer than all planes of at least one of the multiple dice.

12. The method of claim 11, wherein the second quantity is half of the first quantity.

13. The method of claim 11, wherein the method includes adjusting the particular quantity of memory blocks to achieve a particular percentage of overprovisioning.

14. The method of claim 11, wherein the method includes forming a first superblock having the second quantity of memory blocks allocated thereto by omitting a memory block from at least one plane of each of the multiple dice.

15. The method of claim 11, wherein the method includes forming a first superblock having the second quantity of memory blocks allocated thereto by omitting a memory block from at least one plane of at least two of the multiple dice.

16. The method of claim 11, wherein the method includes forming a first superblock having the second quantity of memory blocks allocated thereto by omitting a memory block from only one plane of only one of the multiple dice.

17. An apparatus, comprising:
   a memory device comprising multiple memory dice, wherein each of the memory dice comprises a plurality of planes of memory blocks; and
   a media management component coupled to the memory device and configured to:
      cause a first superblock to be formed using at least two memory blocks from each memory die of the multiple dice, wherein the at least two memory blocks are from different planes within the corresponding memory die, and wherein forming the first superblock includes omitting at least one memory block from at least one additional plane of at least one of the multiple memory dice; and
      cause a second superblock to be formed using at least two memory blocks from each memory die of the multiple dice, wherein the at least two memory blocks are from different planes within the corresponding memory die, and wherein forming the second superblock includes omitting at least one memory block from at least one additional plane of at least one of the multiple memory dice, the at least one additional plane being different from the at least one additional plane omitted for the first superblock.

18. The apparatus of claim 17, wherein forming the first superblock and the second superblock reduces a percentage of memory block overprovisioning associated with the memory device.

19. The apparatus of claim 17, wherein the first superblock or the second superblock, or both, contains at least one fewer memory block than a superblock that includes one memory block from each plane of the memory device.

20. The apparatus of claim 17, wherein the memory device and the media management component are resident on a mobile computing device.

* * * * *